Figure 1:
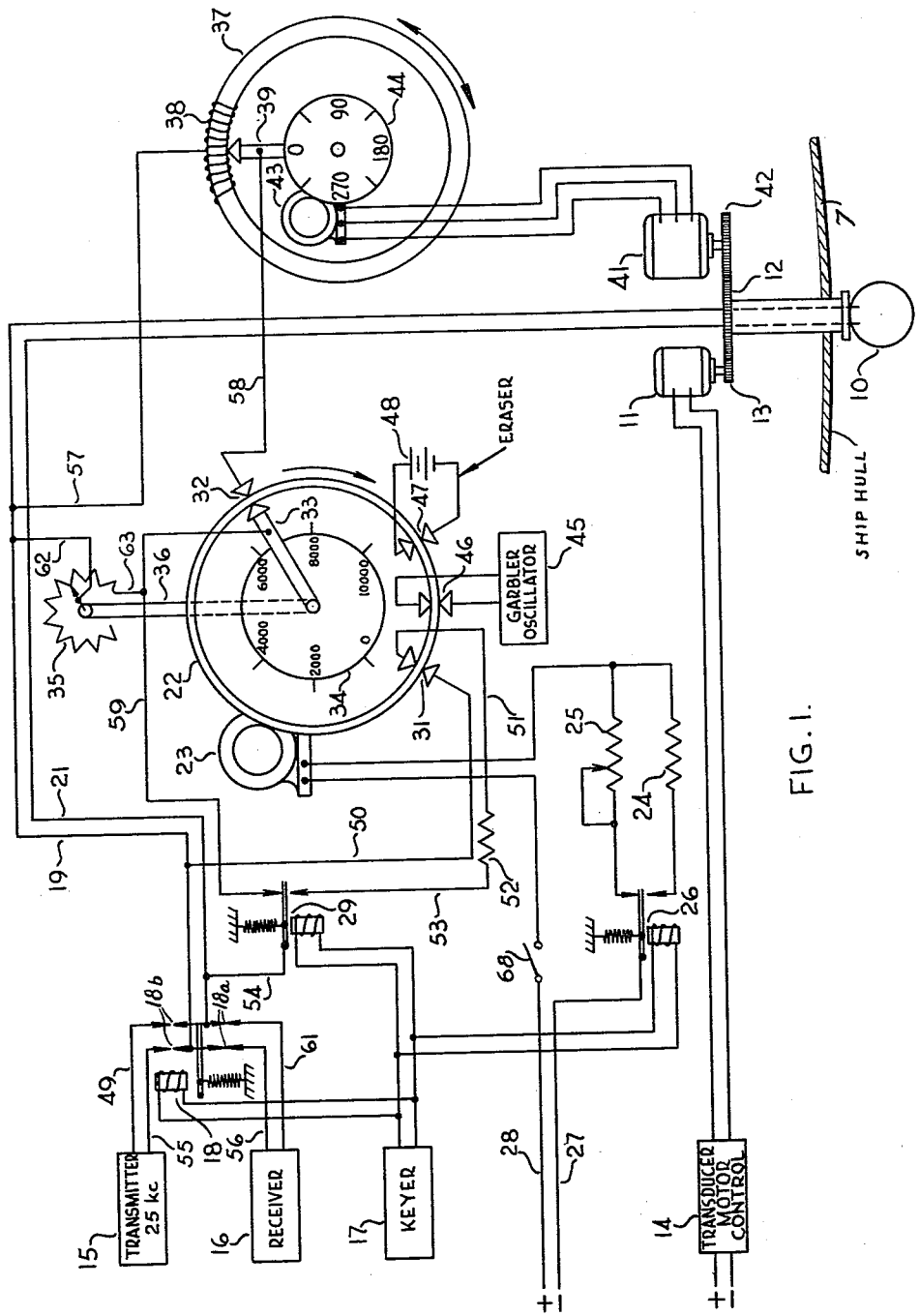

July 26, 1955

E. W. SPRINGER 2,713,729

ECHO INJECTOR

Filed Sept. 24, 1943

2 Sheets-Sheet 1

INVENTOR
EARL W. SPRINGER
BY
ATTORNEY

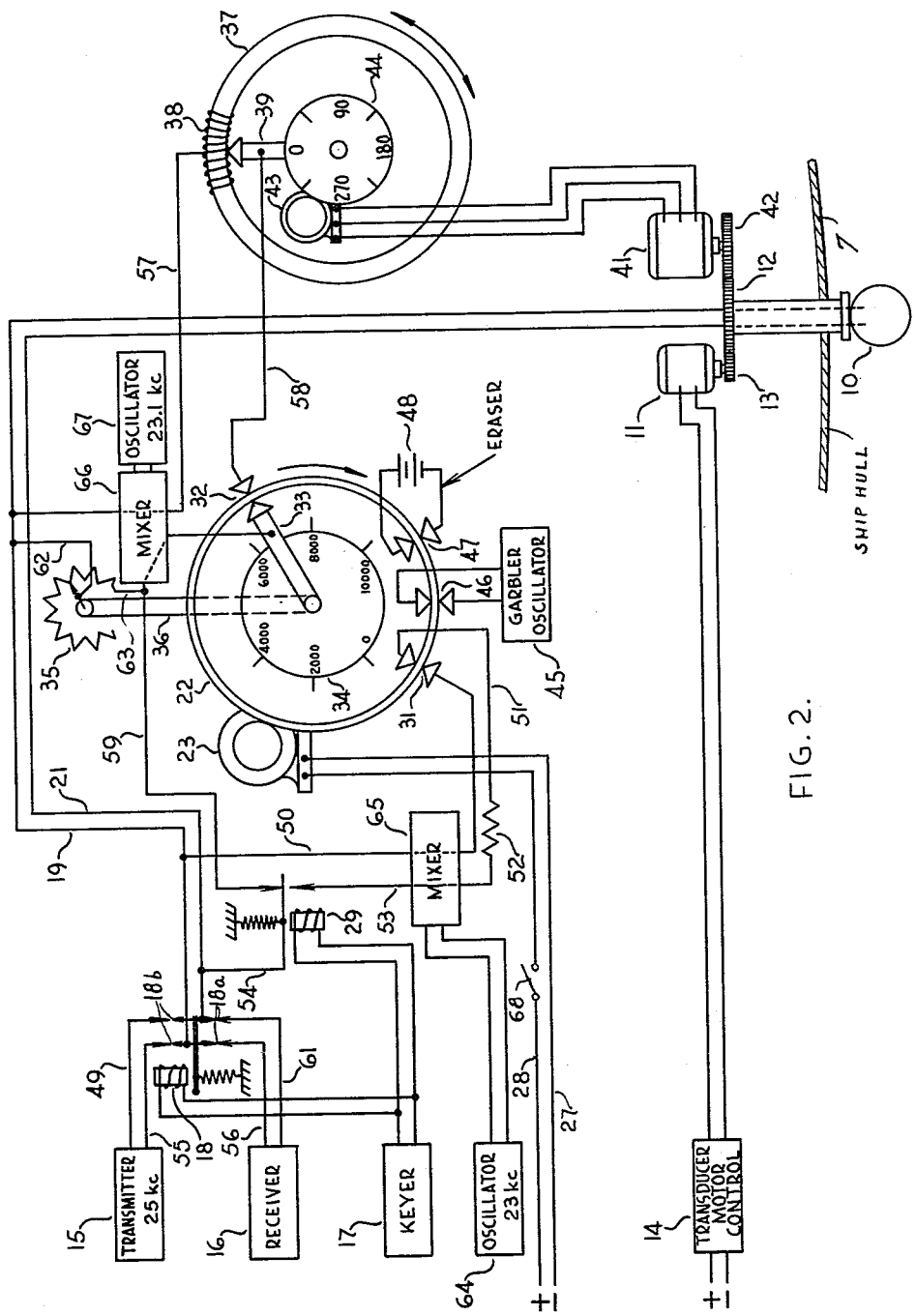

United States Patent Office 2,713,729
Patented July 26, 1955

2,713,729

ECHO INJECTOR

Earl W. Springer, Washington, D. C.

Application September 24, 1943, Serial No. 503,624

11 Claims. (Cl. 35—10.4)

(Granted under Title 35, U. S. Code (1952), sec. 266)

This invention relates to a device for training personnel in the use of underwater sound echo-ranging apparatus.

In one type of underwater sound echo-ranging apparatus to which this invention relates, there is provided a direction sensitive transducer located beneath the water's surface and which may be rotated in azimuth thru 360°, a transmitter for producing oscillations of supersonic frequency, a receiver, and a keyer for alternately connecting the transducer with the transmitter and receiver. When the transmitter is connected to the transducer, a pulse of compressional wave energy, often referred to as a ping, is projected from the transducer. The transducer which is usually of the crystal or magnetostrictive type is so designed that the energy is projected in the form of a beam. Thus such energy may be beamed in any direction at will since the transducer is rotatable through 360°.

When the energy pulse has been emitted from the transducer, the keyer connects the receiver to the transducer. Thus should an energy pulse strike an underwater target such as a submarine, the echo of the pulse will travel back to the transducer and produce an echo signal at the terminals of the receiver. This signal may be indicated aurally to the operator by a heterodyne arrangement which reduces the supersonic frequency echo to an audio note.

Thus the operator will know that some underwater target is located at the bearing of the transducer at which the echo pulse was received. The range of the target is of course a function of the time required for the energy pulse to travel to and return from the target since the velocity of compressional waves in water is constant.

If the transducer is not directly on the target, the echo pulse will be attenuated until it is lost altogether. Thus when a target is located, the operator endeavors to keep the transducer so trained that the echo signal is of maximum intensity.

The intensity of the echo signal will also be somewhat proportional to the range of the target. Thus it is quite high when the target is at close range but becomes progressively weaker as the range increases.

Another characteristic present in this type of apparatus is the Doppler effect on the echo signal caused by relative motion between the transducer and target. Thus if the range of the target is increasing, the frequency of the echo pulse will be less than that of the transmitted pulse. On the other hand, if the range is decreasing, the frequency of the echo pulse will be greater than that of the transmitted pulse.

Because of interferences of several kinds such as reverberations of the transmitted pulse from objects nearby the ship on which the apparatus is located such as the ocean bottom, noise produced by the ship's propellers, ship motion, etc., it is often quite difficult to distinguish a true echo from the target from the rest of the noise present and hence much training is required to master this technique.

However, during time of war, a real submarine when used only as a target for training purposes is a waste of material and personnel. Further, during war, the number of operators needed is obviously greatly increased.

Because of these factors, it is the general object of my invention to provide an inexpensive and comparatively simple device which can be attached to standard underwater echo ranging apparatus for introducing a simulated echo in place of the real echo which would ordinarily be received in such echo ranging apparatus from an actual underwater target.

Other objects are to provide a device of the character described in which:

(a) The Doppler effect on the wave pulse may be introduced in variable degree into the simulated echo;

(b) The range of the simulated echo may be varied;

(c) Attenuation of the simulated echo with variation in range is produced; and (d) Attenuation of the simulated echo with slight changes in bearing of the transducer is effected.

A more specific object is to provide a device of the character described wherein a pulse of energy from the transmitter portion of an echo ranging apparatus is recorded on a magnetic tape recorder and then "played back" into the receiver portion after a preselected time interval to produce a simulated echo.

Another specific object is to provide for driving the tape recorder at one speed during recording of the energy pulse and at a different speed during play back to thereby introduce the Doppler effect.

Yet another specific object is to provide for varying the position of the play back arm along the recorder tape to thereby vary the time at which the simulated echo is played back into the receiver.

Still another object is to provide for introducing the Doppler effect into the simulated echo by the use of a mixer-oscillator arrangement in the playback circuit of the recorder which produces an echo pulse of a frequency differing from the frequency of the transmitter pulse.

These and other objects of the invention will become more apparent from the detailed description to follow and from the accompanying drawings in which preferred embodiments of the invention are illustrated.

In the drawings, in which like reference characters are used to indicate like elements, Figs. 1 and 2 are combined schematic and diagrammatic views of the two preferred embodiments of the invention illustrating the manner in which each may be applied to standard echo ranging equipment.

As previously explained, the main components of an echo ranging apparatus comprise the rotatable transducer, and its control, transmitter, receiver and relay or "keyer" for alternately connecting the transducer first with the transmitter for sending out a pulse of compressional wave energy and then with the receiver for listening for an echo.

In Fig. 1, the reference numeral 10 indicates such a transducer which is adapted to project below the surface of the water, usually through the hull 7 of a ship below the water line. A motor 11 by means of meshed gears 12 and 13 controls its rotation and the motor 11 is in turn controlled by an operator through any suitable starter and control means shown by the block diagram 14.

The transmitter 15, receiver 16 and keyer 17 are of conventional design and are therefore also illustrated in block diagram only.

The keyer 17 controls the operation of a relay 18. The contacts 18a of relay 18 when the latter is not energized, which is the position shown in Fig. 1, connect the receiver 16 with the transducer 10 through conductors 19 and 21. When relay 18 is energized, the contacts 18b connect the transmitter 15 with the transducer 10.

The device illustrated in Fig. 1 for introducing an echo in simulation of the real echo which would normally be received by the transducer 10 from an underwater target in the path of the beam of the transmitted compressional wave of supersonic frequency, includes a magnetic tape recorder 22 which is rotated by means of a motor 23. The speed of motor 23 and hence of the tape recorder 22 is made selectively variable by means of a parallel arrangement of a fixed resistor 24 and a variable resistor 25 which are alternatively connected by a relay 26 in circuit with conductors 27 and 28 which lead from a power source to the motor 23.

Control of relay 26 is also from the keyer 17 and the arrangement is such that relays 18 and 26 are energized together.

Another relay 29, which is also energized by the keyer 17 connects a recording head 31 with transmitter 15 when relay 29 is energized. When in a deenergized position, a playback head 32 is connected with the receiver 16.

The play back head 32 is mounted on an arm 33 which is rotatable over the tape 22 to vary the distance along the tape 22 between the recording head 31 and play back head 32. Control of the arm 33 is by an instructor and, as will be explained hereinafter, the particular position of this arm determines the time interval between recording and playback of the pulse. This time interval may be calibrated in yards of range and marked on an indicator dial 34.

Connected in circuit between the playback head 32 and receiver 16 is a variable resistor 35 which is controlled by the arm 33, through a suitable coupling 36. The arrangement is such that as the arm 33 moves clockwise to increase the range, the amount of resistance in the resistor 35 in circuit with the play-back head 32 and receiver 16 increases. This serves to attenuate the simulated echo with range which is a natural characteristic of actual echoes received from underwater targets.

Also connected in circuit with the play-back head 32 is a device for giving training to an operator in locating the bearing from which the simulated echo is received. This device consists of a ring member 37 on which is wound a resistor 38. Ring 37 is rotatable and its position is controlled by an instructor. An arm 39 is adapted to rotate concentrically with the ring 37 and its rotation is arranged so as to follow rotation of the transducer 10. The necessary interconnection between the transducer 10 and arm 39 is by means of a synchro tie arrangement consisting of a self-synchronous generator 41 which is driven through meshed gears 12 and 42, and a self-synchronous motor 43 which drives a disc 44 to which arm 39 is secured. The disc 44 may be marked in degrees and arranged to be visible to the operator of the transducer but the operator can not see the relative positions of the arm 39 and resistor 38.

The end of arm 39 is of course adapted to make a wiping contact over resistor 38. Resistor 38 is connected at its midpoint into the playback circuit. Arm 39 is also connected in this circuit thus producing a variable resistor arrangement, the amount of resistance in circuit depending upon the relative position between the arm 39 and resistor 38. When the elements are in the positions illustrated in Fig. 1, the amount of such resistance is minimum but as the arm 39 and midpoint of resistor 38 separate, the resistance in circuit with the playback head will increase to thereby attenuate the echo signal. When contact no longer is made between arm 39 and resistor 38, an open circuit in the playback circuit results and no echo signal whatsoever is heard.

The above arrangement simulates very closely the attenuation effect produced on the natural echo resulting from an actual underwater target when the transducer is rotated relative to the target.

With shipboard apparatus, noise to simulate high speed operation of the vessel when the latter is stationary or travelling only at low speed, and noise to simulate propeller sounds from a submarine target may be introduced by a garbler oscillator 45, the output of which is connected to tape 22 through head 46.

In order to erase the recording of the transmitted pulse on the tape 22, an eraser head 47 is provided and this head is supplied with a strong direct current potential such as from battery 48.

Operation of system

In Fig. 1

Let it be assumed that the operating parts of my training device are set in the positions shown in Fig. 1. Thus arm 33 is set for a range of approximately 7000 yards, and the ring 37 is set for a simulated target at 0° bearing relative to the lubber line of the vessel on which the equipment is installed.

The motor 23 is then started which causes tape recorder 22 to be rotated in the direction of the arrow at a speed determined by the value of variable resistor 25.

Keyer 17 functions to energize relays 18, 26 and 29 for very short periods of time. Relays 18 and 29 when thus energized connect transmitter 15 to the recording head 31 on the tape 22 with the result that a short pulse of the output from transmitter 15 is recorded over a small portion of the surface of tape 22. This circuit can be traced from one output terminal of transmitter 15 through conductor 49, one pair of contacts 18b of relay 18, conductor 19, conductor 50, recording head 31, conductor 51, resistor 52, conductor 53, contacts of relay 29, conductors 54 and 21, another set of contacts 18b of relay 18 and conductor 55 back to the other output terminal of transmitter 15.

Energization of relay 26 connects resistor 24 in circuit with motor 23 causing it and the tape 22 to rotate at a speed determined by the value of fixed resistor 24.

When keyer 17 functions to deenergize relays 18 and 29, receiver 16 is connected to the playback head 32 and when relay 26 is deenergized, the speed of tape 22 is changed to the value determined by the setting of variable resistor 25.

The circuit connecting the receiver 16 to playback head 32 may be traced from one terminal on receiver 16 through conductor 56, one set of contacts 18a on relay 18, conductors 19 and 57, resistor 38, arm 39, conductor 58, playback head 32, arm 33, conductor 59, relay contacts 29, conductors 54 and 21, another set of contacts 18a on relay 18 and conductor 61 to the other terminal of receiver 16.

Thus when the portion of tape 22 containing the recorded pulse passes under the playback head 32, the "echo" of the pulse will be injected into receiver 16 where it is to be detected by the operator, provided, however, that the instant bearing of projector 10 which is controlled by the operator is such that arm 39 is in contact with resistor 38. If the bearing of projector 10 is such that arm 39 is not in contact with any portion of resistor 38, the playback receiver circuit will of course be open and no echo will be heard.

If no echo is heard, the operator will, through control 14, rotate transducer 10 until the echo is picked up. This feature gives the operator training in picking up an echo.

The instructor may also vary the position of ring 37 and hence resistor 38 to give the operator training in maintaining the transducer right on the target, i. e. the position in which arm 39 contacts the middle of resistor 38.

As previously explained resistor 35 is also connected in the receiver-transducer circuit through conductors 62 and 63 and functions to properly attenuate the echo signal in accordance with range.

The speed of tape 22 as previously explained is determined by resistors 24 and 25 and the arrangement is such that its speed on playback may be equal to, greater than, or less than its speed on recording. Any changes in frequency of the received echo signal from that of the transmitted signal accordingly introduces a Doppler effect thereby simulating relative motion between the ship on which the echo ranging apparatus is located and the assumed target from which the simulated echo is received. The operator is enabled to distinguish this change in frequency by noting the difference between the pitch of reverberations in the receiver caused from near by objects (which is substantially the same as the pitch of the transmitted pulse) and the pitch of the simulated echo pulse.

As the recorded pulse passes under the eraser head 47, it is "wiped" off tape 22, leaving the tape clear for the next pulse to be recorded thereon.

Thus the operator is given training in locating a target, keeping the transducer trained directly on the target, receiving echoes at different ranges, and recognizing the existence and amount of doppler present from which the speed of the target may be approximated.

In Fig. 2, which illustrates a modification of the apparatus shown in Fig. 1, a different means is used to introduce the Doppler effect into the simulated echo pulse. Further, a heterodyning arrangement is employed to reduce the frequency of the transmitted pulse before recording on the magnetic tape recorder.

Referring now to Fig. 2, the arrangement of parts is quite similar to those in Fig. 1. However, in the circuit for recording a pulse on tape 22 from transmitter 15, there is included an auxiliary oscillator 64, the output of which is at a frequency differing from the output frequency of the transmitter. Thus if the frequency of transmitter 15 is 25 kc., the frequency of oscillator 64 might be 23 kc.

When relays 18 and 29 are energized, the pulse from transmitter 15 passes through the relays 18 and 29 into a mixer 65 which heterodynes this pulse with the output of oscillator 64 to produce a substantially lower beat frequency which is then recorded on tape 22.

A second mixer 66 and oscillator 67 are included in circuit with the playback head 32.

If the Doppler effect is desired, the output frequency of oscillator 67 is so selected that when it is combined in mixer 66 with the recorded pulse there will be produced in the output of mixer 66 a frequency which differs from the output frequency of transmitter 15 by the amount of doppler desired.

The mixer 66 will produce both the sum and difference of the two component frequencies, but due to the selectivity of receiver 16, only the sum of the two will be amplified and detected.

Thus, for example, with a transmitted frequency of 25 kc. and the output of oscillator 64 set at 23 kc., the recorded frequency would be 2 kc. On playback, with oscillator 67 set at 23.1 kc., the mixer 66 will produce frequencies of 25.1 kc. and 21.1 kc. at the terminals of receiver 16. If no tuning adjustment of receiver 16 has been made between transmission and playback, the receiver 16 will amplify the 25.1 kc. pulse. This latter pulse when beat down in receiver 16 will produce an audio note 100 cycles higher than the reverberation frequency which is substantially the same as the transmitted frequency, thus indicating a closing doppler. In a similar manner, by changing the frequency of oscillator 67, the extent of either opening or closing doppler may be artificially produced.

Of course, if no Doppler effect was desired, the frequency of oscillator 67 would be set at 23 kc.

The arrangement in Fig. 2 has an advantage over that shown in Fig. 1 in that the speed of the tape 22 does not have to be changed during playback of the recorded pulse in order to introduce the Doppler effect. Further, recording and playback of the transmitted pulse on the tape 22 is more satisfactory at the lower frequency.

Otherwise the arrangement in Fig. 2 is the same as in Fig. 1.

It should be understood that the training apparatus of either Fig. 1 or 2 is intended to be connected to existing ship installed echo ranging gear which includes transmitter 15, receiver 16, keyer 17 and transducer 10, the latter projecting down through the hull of the ship into the water. The training apparatus injects a simulated echo into the receiver 16 where is is aurally detected by the operator and thus furnishes training for him; that is to say, each time that keyer 17 functions to energize relay 18, a pulse is actually transmitted into the surrounding water from the transducer 10 but, in lieu of an echo returning to the transducer 10 from an actual underwater target such as a submarine, the training apparatus, via the magnetic tape recorder structure, previously described, injects a simulated echo into the receiver 16 after a predetermined time interval to give the operator the same type of a signal that he would otherwise receive from an actual underwater target reflecting the transmitted pulse. Accordingly, all information normally available to the operator, including water noise, reverberation and other noises in the surrounding water, is still presented to him since the transducer 10 picks these up and returns them to the receiver 16.

Thus, in operation of the training apparatus of the present application, should any echo of the transmitted pulse from a real target within range of the system be returned to transducer 10 and passed from there into the receiver 16, the operator will, of course, hear two echo signals i. e. the echo from the actual target and the simulated echo artificially injected by the magnetic tape recorder. Under these conditions the apparatus for artifically injecting the simulated echo would be disconnected by suitable switch means 68 which would stop motor 23 and tape recorder 22, and normal echo ranging procedure would be resumed with respect to detection of the actual underwater target.

In conclusion, while the foregoing embodiments of my invention are preferred ones, it will be readily understood that various changes and modifications may be made therein without departing from the spirit and scope of the appended claims.

The invention described herein may be manufactured and used by or for the Government of the United States of America for governmental purposes without the payment of any royalties thereon or therefor.

I claim:

1. A training device for use with echo ranging apparatus comprising a transmitter, a receiver, and a transducer, a keyer emitting a single pulse from said transmitter for transmission into a medium by said transducer on a preselected bearing sector, means for feeding said pulse to said receiver to produce a simulated echo, pulse time lag means interposed between said transmitter and said receiver controlling the magnitude of the period of time said pulse is delayed before being applied to said receiver, a range dial on said time lag means indicating the distance corresponding to the magnitude of the time lag, and remote bearing indicating means associated with said receiver indicating the bearing on which said pulse was emitted by said transducer into said medium.

2. A training device for simulating the echo of a pulse reflected by an underwater target comprising, in combination, a transmitter, a receiver, a transducer, and a magnetic tape recorder, a recording head and a playback head on said tape recorder, a keyer emitting a pulse from said transmitter for transmission into a medium by said transducer on a preselected bearing sector, means simultaneously feeding said pulse to said recording head on said tape recorder prior to delivery by said playback head to said receiver, recording speed control means on said recorder for varying the frequency of said pulse delivered to said receiver, and remote bearing indicating means connected between said recorder and said receiver for indicating the bearing on which said pulse was emitted by said transducer into said medium.

3. The combination in claim 1 and further including means for limiting reception of the pulse output of said transmitter to a preselected bearing sector of said transducer, and means for attenuating said echo pulse on each side of the mean bearing in said sector.

4. The combination in claim 1 and further including means for introducing a frequency shift into said corresponding pulse prior to its application to said receiver to thereby produce a Doppler effect in the simulated echo.

5. The combination in claim 2 and further including means for recording said pulse at one tape speed and playing back said recorded pulse at a different tape speed to simulate the Doppler effect caused by relative motion between a ship on which the echo ranging apparatus is located and an underwater target.

6. The combination in claim 2 and further including means for varying the spacing on said tape between said recording and playback heads to vary the time interval of the playback of said recorded pulse and means for attenuating the playback pulse in accordance with changes in said spacing.

7. The combination in claim 2 and further including means interposed in the receiver-playback circuit for selecting a bearing at which said simulated echo pulse is to be played back into said receiver.

8. The combination in claim 2 and further including means interposed in the receiver-playback circuit for selecting a bearing sector at which said simulated echo pulse is to be played back into said receiver, and means for attenuating said echo pulse on each side of the middle of said sector.

9. In underwater echo ranging apparatus including a transducer, a transmitter, a receiver, and transfer means for alternately connecting said transducer in circuit with said transmitter and then with said receiver, a training device for producing a simulated target echo comprising a magnetic movable tape recorder having a recording head and a playback head thereon at a preselected distance apart, means for moving said tape, and means operable with said transfer means for alternately connecting said transmitter with said recording head and said receiver with said playback head whereby a pulse from said transmitter may be recorded on the tape of said recorder and then played back into said receiver to simulate an actual echo of said transmitted pulse from an underwater target.

10. In underwater echo ranging apparatus including a transducer, a transmitter having a supersonic frequency output, and a receiver having means for heterodyning echoes of the transmitter output to produce audio frequency echoes, a training device for producing an echo in simulation of the echo of a pulse from said transmitter when reflected from an underwater target, said device comprising a first oscillator, a first mixer for combining the outputs from said transmitter and first oscillator to produce audio frequency pulses, a magnetic movable tape recorder having a recording head and a playback head thereon at a preselected distance apart, means for moving said tape, means for connecting the output of said first mixer to said recording head, a second mixer connected to said playback head, a second oscillator connected to said second mixer, said second mixer functioning to combine the audio frequency pulse picked up by said playback head with the output of said second oscillator, and means connecting the output of said second mixer to said receiver.

11. The combination in claim 10 wherein the output frequencies of said first and second oscillators differ from each other to thereby produce a simulated echo having a frequency different from that of the transmitted pulse.

References Cited in the file of this patent

UNITED STATES PATENTS

| | | |
|---|---|---|
| 1,859,423 | Arnold | May 24, 1932 |
| 2,105,318 | Goldsmith | Jan. 11, 1938 |
| 2,354,176 | Goldsmith | July 18, 1944 |
| 2,327,956 | Begun | Aug. 24, 1943 |
| 2,385,701 | Halstead | Sept. 25, 1945 |